United States Patent
Gan et al.

(10) Patent No.: US 11,721,128 B2
(45) Date of Patent: Aug. 8, 2023

(54) BEAUTY PREDICTION METHOD AND DEVICE BASED ON MULTITASKING AND WEAK SUPERVISION, AND STORAGE MEDIUM

(71) Applicant: Wuyi University, Jiangmen (CN)

(72) Inventors: Junying Gan, Jiangmen (CN); Zhenfeng Bai, Jiangmen (CN); Yikui Zhai, Jiangmen (CN); Guohui He, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 258 days.

(21) Appl. No.: 17/424,407

(22) PCT Filed: Jul. 24, 2020

(86) PCT No.: PCT/CN2020/104568
§ 371 (c)(1),
(2) Date: Jul. 20, 2021

(87) PCT Pub. No.: WO2021/258481
PCT Pub. Date: Dec. 30, 2021

(65) Prior Publication Data
US 2022/0309828 A1  Sep. 29, 2022

(30) Foreign Application Priority Data
Jun. 24, 2020  (CN) .......................... 202010587525.5

(51) Int. Cl.
*G06V 40/16*  (2022.01)
*G06V 10/70*  (2022.01)
*G06V 10/22*  (2022.01)

(52) U.S. Cl.
CPC ............ *G06V 40/169* (2022.01); *G06V 10/22* (2022.01); *G06V 10/87* (2022.01)

(58) Field of Classification Search
CPC ...... G06V 40/169; G06V 10/22; G06V 10/87; G06V 10/806; G06V 10/811; G06V 10/82;
(Continued)

(56) References Cited

U.S. PATENT DOCUMENTS

| 11,042,785 B2* | 6/2021 | Cox .................... G06F 18/2413 |
| 2020/0395117 A1* | 12/2020 | Schnorr ................ G06N 3/088 |
| 2023/0114934 A1* | 4/2023 | Liao ..................... G06T 7/0012 |
| | | 382/128 |

FOREIGN PATENT DOCUMENTS

| CN | 108399406 A | 8/2018 |
| CN | 110119689 A | 8/2019 |

(Continued)

OTHER PUBLICATIONS

Hu, Mengying et al. Weakly Supervised Image Classification Through Noise Regularization IEEE Conference on Coomputer Vision and Pattern Recognition, Jun. 20, 2019, pp. 11517-11525, doi: 10.1109/CVPR.2019.01178, IEEE.
(Continued)

*Primary Examiner* — Phuoc Tran
(74) *Attorney, Agent, or Firm* — Vivacqua Crane, PLLC

(57) ABSTRACT

A beauty prediction method and device based on multitasking and weak supervision, and a storage medium are disclosed. The method includes the steps of pre-processing inputted facial images; allocating the pre-processed images to multiple tasks; extracting shared image features; and obtaining a plurality of classification results via a plurality of classification networks each including a residual network, a standard neural network and a classifier.

17 Claims, 3 Drawing Sheets

(58) Field of Classification Search
CPC .... G06V 40/16; G06V 40/172; G06V 40/161; G06V 40/168; G06F 18/214; G06F 18/241; G06N 3/045; G06N 3/08
See application file for complete search history.

(56) References Cited

FOREIGN PATENT DOCUMENTS

| | | |
|---|---|---|
| CN | 110147456 A | 8/2019 |
| CN | 110414489 A | 11/2019 |

OTHER PUBLICATIONS

Multi-task loss balance problem in multi-task multi-task, https:/blog.csdnnet/qg_?4527082/article/details/1OO048864, (2019), pp. 1-2.

* cited by examiner

BEAUTY PREDICTION METHOD AND DEVICE BASED ON MULTITASKING AND WEAK SUPERVISION, AND STORAGE MEDIUM

CROSS-REFERENCE TO RELATED APPLICATIONS

This application is a national stage filing under 35 U.S.C. § 371 of international application number PCT/CN2020/104568, filed Jul. 24, 2020, which claims priority to Chinese patent application No. 2020105875255 filed Jun. 24, 2020. The contents of these applications are incorporated herein by reference in their entirety.

TECHNICAL FIELD

The present disclosure relates to the field of image processing, in particular to a beauty prediction method and device based on multitasking and weak supervision, and a storage medium.

BACKGROUND

Facial beauty prediction technology is a combination of image processing and artificial intelligence to intelligently judge a facial beauty level. At present, the facial beauty prediction technology is mainly implemented by deep learning, but a deep learning network requires a large number of training samples, has an easily overfitted training model, ignores a correlation and a difference between multiple tasks, has a high cost on data labeling in strong supervised learning, and ignores an actual situation that it is difficult to obtain all truth value labels in a database. At present, most tasks are model training for a single task and strong label data, the single task ignores the relevance between the tasks, and tasks in real life are often inextricably linked; and it is difficult to obtain all strong label data in real life, and it is expensive to obtain all true-value labels

SUMMARY

The present disclosure aims to resolve at least one of the technical problems in the existing technology by providing a beauty prediction method and device based on multitasking and weak supervision, and a storage medium.

The technical solutions adopted by the present disclosure to resolve its technical problems are described as follows.

According to a first aspect of the present disclosure, the beauty prediction method based on multitasking and weak supervision includes the following steps:

pre-processing inputted face images to obtain pre-processed images, where the pre-processed images include true value images marked with true value labels and noise images marked with noise labels;

allocating the pre-processed images to multiple tasks, where each task includes a plurality of the true value images and a plurality of the noise images, and the multiple tasks include one main task specifically for facial beauty prediction and multiple auxiliary tasks related to the facial beauty prediction;

processing the true value images and noise images of the multiple tasks via a feature extraction layer to obtain shared image features; and processing the image features via a plurality of classification networks each including a residual network, a standard neural network and a classifier to obtain a plurality of classification results, where each of the plurality of classification networks corresponds to a respective one of the multiple tasks.

In each of the classification networks, the residual network processes the image features, learns mapping from the image features to residual values of the true value labels and the noise labels and obtains a first predicted value; the standard neural network learns mapping from the image features to the true value labels and obtains a second predicted value; and each of the classification results is obtained by the classifier according to the first predicted value and the second predicted value.

According to the first aspect of the present disclosure, the pre-processing inputted facial images to obtain pre-processed images includes sequentially performing image enhancement, image correction, image cropping, image de-duplication and image normalization on the facial images to obtain the pre-processed images.

According to the first aspect of the present disclosure, the feature extraction layer is one of VGG16, ResNet50, Google Inception V3 or DenseNet.

According to the first aspect of the present disclosure, an overall loss function of the multiple tasks is $L_{total}=\Sigma_1^n \omega_n * L_n$, where L is a loss of a single task, and $\omega_n$ is a weight corresponding to each task.

According to the first aspect of the present disclosure, a loss function of the residual network is $$L_{noise} = \frac{1}{N_n} \sum_{i \in D_n} (y_i \ln(h_i) + (1 - y_i)\ln(1 - h_i)),$$

where $D_n$ is the image feature, $y_i$ is the noise label, $h_i$ is the first predicted value, $L_{noise}$ is a loss value of the residual network, and $N_n$ is a total number of the image features.

According to the first aspect of the present disclosure, a loss function of the standard neural networks is $$L_{clean} = \frac{1}{N_n} \sum_{j \in D_n} (v_j \ln(g_j) + (1 - y_j)\ln(1 - g_j)),$$

where $v_i$ is the true value label, $g_j$ is the second predicted value, and $L_{clean}$ is a loss value of the standard neural network.

According to the first aspect of the present disclosure, an overall goal of the plurality of classification networks is $$\underset{W}{\operatorname{argmin}} ((\alpha L_{clean,1} + L_{noise,1}) + \ldots + (\alpha L_{clean,n} + L_{noise,n})),$$

where W is a hyper-parameter, and $\alpha$ is a balance parameter between the loss value of the residual network and the loss value of the standard neural network.

According to the first aspect of the present disclosure, the noise images are more than the true value images in each task.

According to a second aspect of the present disclosure, a beauty prediction device based on multitasking and weak supervision is provided, including:

a pre-processing module, configured to pre-process inputted facial images to obtain pre-processed images, where the pre-processed images include true value images marked with true value labels and noise images marked with noise labels;

a multitasking module, configured to allocate the pre-processed images to multiple tasks, where each task includes a plurality of the true value images and a plurality of the noise images, and the multiple tasks include one main task specifically for facial beauty prediction and multiple auxiliary tasks related to the facial beauty prediction;

a feature extraction module, configured to process the true value images and the noise images of the multiple tasks to obtain shared image features; and a classification module, configured to process the image features to obtain a plurality of classification results and includes a plurality of classification networks each including a residual network, a standard neural network and a classifier, where each of the plurality of classification networks corresponds to a respective one of the multiple tasks.

In each of the classification networks, the residual network processes the image features, learns mapping from the image features to residual values of the true value labels and the noise labels and obtains a first predicted value; the standard neural network learns mapping from the image features to the true value labels and obtains a second predicted value; and each of the classification results is obtained by the classifier according to the first predicted value and the second predicted value.

According to the first aspect of the present disclosure, a storage medium is provided storing executable instructions which, when executed by a computer, cause the computer to perform the beauty prediction method based on multitasking and weak supervision according to the first aspect of the present disclosure.

The foregoing solutions have at least the following beneficial effects: the correlation and differences among the multiple tasks are utilized to enhance the expression ability of facial beauty prediction of the main task; and the classification networks in a weak supervision mode reduce dependence on the true value labels, reduce the cost of data labeling, reduce the influence of the noise labels on a facial beauty prediction model, and improve the generalization ability of the facial beauty prediction model.

Additional aspects and advantages of the present disclosure will be set forth in part in the description that follows, and, in part, will be obvious from the description, or may be learned by practice of the present disclosure.

BRIEF DESCRIPTION OF DRAWINGS

The present disclosure will be further illustrated hereinafter with reference to the accompanying drawings and exemplary embodiments.

DETAILED DESCRIPTION

Specific embodiments of the present disclosure will be described in detail in this section, the preferred embodiments of the present disclosure are illustrated in the accompanying drawings, and the accompanying drawings serve as a supplement to the literal description of the Specification so that a person can intuitively and vividly understand each technical feature and overall technical solutions of the present disclosure, but shall not be understood as limitations to the scope of the present disclosure.

In the description of the present disclosure, it should be construed that the orientation descriptions, such as orientations or positional relationships indicated by upper, lower, front, rear, left and right are based on the orientations or positional relationships shown in the accompanying drawings, these terms are just used to facilitate description of the present disclosure and simplify the description, but not to indicate or imply that the devices or elements must have specific orientations or be constructed and operated in specific orientations, and therefore, the terms shall not be construed as a limitation to the present disclosure.

In the description of the present disclosure, "several" means one or more, and "a plurality of/multiple" means two or more; "more than", "less than", "exceed" and the like shall not be construed as including the number itself; and "above", "below", "within" and the like shall be construed as including the number itself "First" and "second" described are only for describing the technical features, and shall not be construed as indicating or implying the relative importance or implicitly indicating the quantity of the indicated technical features or implicitly indicating the sequence of the indicated technical features.

In the description of the present disclosure, unless otherwise specified, the terms such as "provided", "mounted" and "connected" shall be understood in a broad sense, and the specific meanings of the terms in the present disclosure can be reasonably determined by those having ordinary skill in the art in light of the specific contents of the technical solutions.

Figure 1:
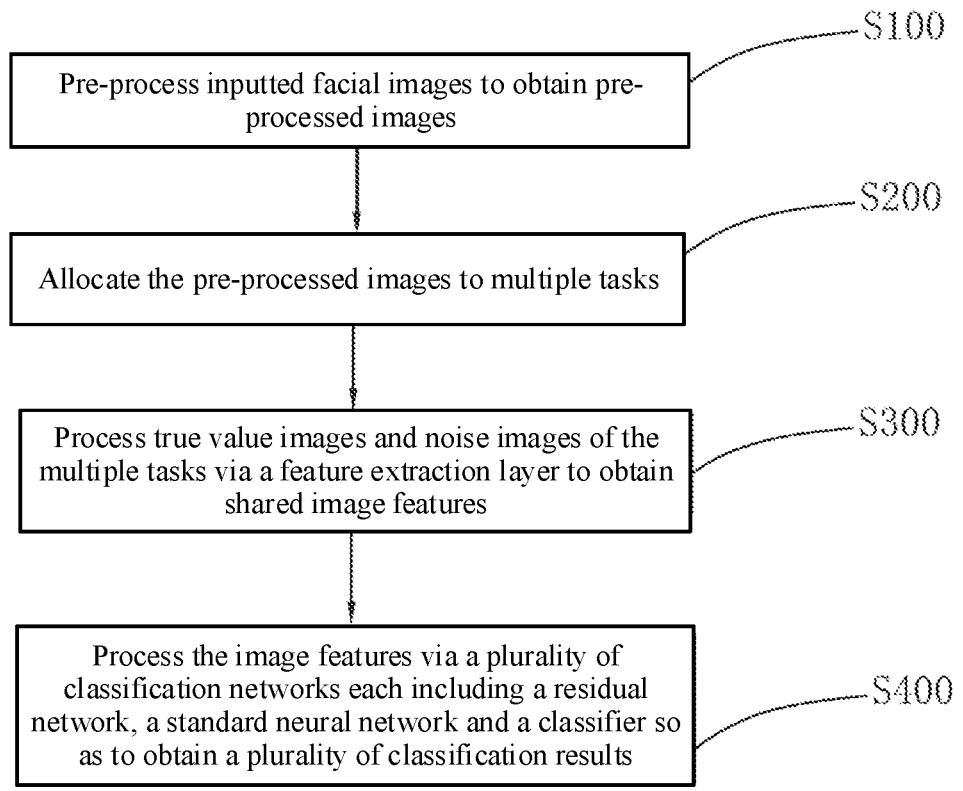
FIG. 1 is a flow chart of a beauty prediction method based on multitasking and weak supervision according to an embodiment of the present disclosure.

Referring to FIG. 1, some embodiments of the present disclosure provide a beauty prediction method based on multitasking and weak supervision, including the following steps:

Step S100, pre-processing inputted facial images to obtain pre-processed images, where the pre-processed images include true value images marked with true value labels and noise images marked with noise labels;

Step S200, allocating the pre-processed images to multiple tasks, where each task includes a plurality of the true value images and a plurality of the noise images, and the multiple tasks include one main task specifically for facial beauty prediction and multiple auxiliary tasks related to the facial beauty prediction;

Step S300, processing the true value images and noise images of the multiple tasks via a feature extraction layer to obtain shared image features; and Step S400, processing the image features via a plurality of classification networks 200 each including a residual network 210, a standard neural network 220 and a classifier 230 to obtain a plurality of classification results, where each of the plurality of classification networks 200 corresponds to a respective one of the multiple tasks.

In each of the classification networks 200, the residual network 210 processes the image features, learns mapping from the image features to residual values of the true value labels and the noise labels and obtains a first predicted value; the standard neural network 220 learns mapping from the image features to the true value labels and obtains a second predicted value; and each of the classification results is obtained by the classifier 230 according to the first predicted value and the second predicted value.

In this embodiment, the correlation and differences among the multiple tasks enhance the expression ability of facial beauty prediction of the main task; and the classification networks 200 in a weak supervision mode reduce dependence on the true value labels, reduce the cost of data labeling, reduce the influence of the noise labels on a facial beauty prediction model, and improve the generalization ability of the facial beauty prediction model.

In addition, in the beauty prediction method based on multitasking and weak supervision, the multiple related tasks are learned at the same time, and the auxiliary tasks improve the accuracy of the main task of facial beauty prediction; the classification networks 200 in the weak supervision mode can effectively use images with true value labels; and the problems of poor model generalization ability, only single-task training, and extra-high data labeling cost are resolved.

It shall be noted that the inputted face images are fused data from a plurality of databases including an LSFBD facial beauty database, a GENKI-4K smile recognition database, an IMDB-WIKI 500 k+ database, and an SCUT-FBP5500 database.

Further, the pre-processing inputted face images to obtain pre-processed images specifically includes sequentially performing image enhancement, image correction, image cropping, image de-duplication and image normalization on the facial images to obtain the pre-processed images. The pre-processing can efficiently perform region detection, key point detection, alignment and cropping on the facial images, so that the facial images have a uniform size, which facilitates subsequent operations.

Figure 3:
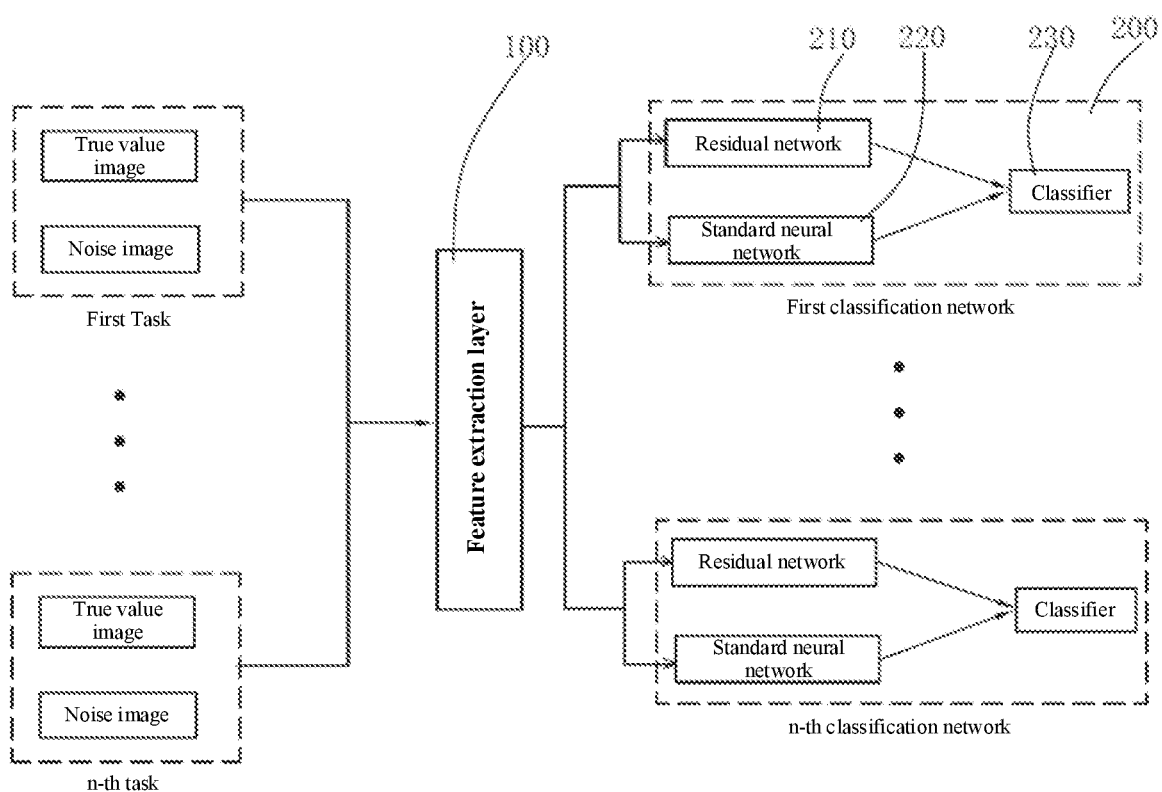
FIG. 3 is a structural view of a facial beauty prediction model.

In fact, the pre-processed images are inputted to the facial beauty prediction model to perform the steps S200, S300, and S400. Referring to FIG. 3 for the structure of the facial beauty prediction model.

Further, with regard to the step S200, the quantity of the noise images is greater than that of the true value images in each task. An overall loss function of the multiple tasks is: $L_{total}=*L_n$, where L is a loss of a single task, and $\omega_n$ is a weight corresponding to each task. It should be noted that the main task is facial beauty prediction; and the auxiliary tasks are tasks related to the facial beauty prediction, such as gender recognition and expression recognition.

Further, the feature extraction layer is one of VGG16, ResNet50, Google Inception V3 or DenseNet. In this embodiment, the feature extraction layer has a specific structure as follows. The first layer is a convolution layer with a size of 3*3; the second layer is a convolution layer with a size of 3*3; the third layer is a convolution layer with a size of 3*3; the fourth layer is a pooling layer; the fifth layer is a convolution layer with a size of 3*3; the sixth layer is a convolution layer with a size of 3*3; the seventh layer is a pooling layer; the eighth layer is a convolution layer with a size of 3*3; the ninth layer is a convolution layer with a size of 3*3; the tenth layer is a convolution layer with a size of 3*3; the eleventh layer is a pooling layer; the twelfth layer is a convolution layer with a size of 3*3; the thirteenth layer is a convolution layer with a size of 3*3; and the fourteenth layer is a pooling layer. The images of the multiple tasks are extracted via the feature extraction layer to obtain the shared image features, and the multiple related tasks are learned in parallel through the shared image features to mine the relationship among the multiple related tasks, thereby obtaining additional useful information.

Further, with regard to the step S400, the loss function of the residual network 210 is: $L_{noise}=1/N_n\Sigma_{i\in D_n}(y_i \ln(h_i)+(1-y_i)\ln(1-h_i))$, where $D_n$ is the image feature, $y_i$ is the noise label, $h_i$ is the first predicted value, $L_{noise}$ is a loss value of the residual network 210, and $N_n$ is a total number of the image features. In the residual networks 210, the mapping from the image features to the residual values of the true value labels and the noise labels is learned, and the first predicted value is obtained; and all the image features entering the residual networks 210 are supervised by using the noise labels.

Further, a loss function of the standard neural network 220 is:

$$L_{clean} = \frac{1}{N_n}\sum_{j\in D_n} (v_j\ln(g_j) + (1 - y_j)\ln(1 - g_j)),$$

where $v_j$ is the true value label, $g_j$ is the second predicted value, and $L_{clean}$ is a loss value of the standard neural network 220. In the standard neural networks 220, the mapping from the image features to the true value labels is learned, and the second predicted value is obtained; and all the image features entering the standard neural networks 220 are supervised by using the true value labels.

In addition, the first predicted value and the second predicted value enter the classifier 230, and the classification result is calculated according to the following formula: $k=W_1a+W_2b$, where k is a classification result, a is a first predicted value, b is a second predicted value, $W_1$ is a weight corresponding to the first predicted value, and $W_2$ is a weight corresponding to the second predicted value.

Further, the overall goal of the plurality of classification networks 200 is $$\operatorname*{argmin}_{W} ((\alpha L_{clean,1} + L_{noise,1}) + \ldots + (\alpha L_{clean,n} + L_{noise,n})),$$

where W is a hyper-parameter, and $\alpha$ is a balance parameter between the loss value of the residual network 210 and the loss value of the standard neural network 220.

Figure 2:
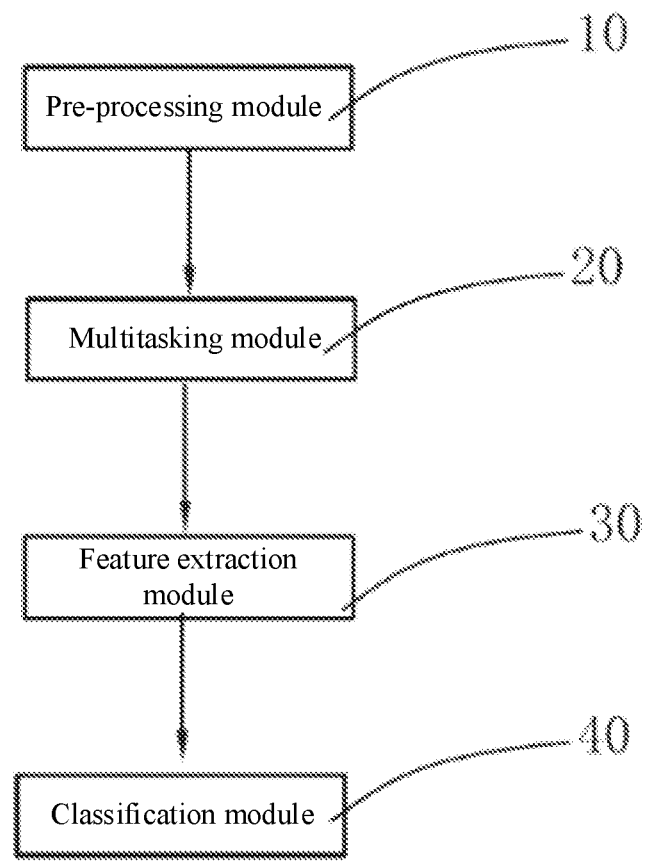
FIG. 2 is a structural view of a beauty prediction device based on multitasking and weak supervision according to an embodiment of the present disclosure.

Referring to FIG. 2, some embodiments of the present disclosure provide a beauty prediction device based on multitasking and weak supervision, using the beauty prediction method based on multitasking and weak supervision as described in the method embodiment, and the beauty prediction device includes:

a pre-processing module 100, configured to pre-process inputted facial images to obtain pre-processed images, where the pre-processed images include true value images marked with true value labels and noise images marked with noise labels;

a multitasking module 200, configured to allocate the pre-processed images to multiple tasks, where each task includes a plurality of the true value images and a plurality of the noise images, and the multiple tasks include one main task specifically for facial beauty prediction and multiple auxiliary tasks related to the facial beauty prediction;

a feature extraction module 300, configured to process the true value images and noise images of the multiple tasks to obtain shared image features; and a classification module 400, configured to process the image features to obtain a plurality of classification results and includes a plurality of classification networks 200 each including a residual network 210, a standard neural network 220 and a classifier 230, where each of the plurality of classification networks 200 corresponds to a respective one of the multiple tasks;

In each of the classification networks 200, the residual network 210 processes the image features, learns mapping from the image features to residual values of the true value labels and the noise labels and obtains a first predicted value;

the standard neural network 220 learns mapping from the image features to the true value labels and obtains a second predicted value; and each of the classification results is obtained by the classifier 230 according to the first predicted value and the second predicted value.

In this device embodiment, the beauty prediction device based on multitasking and weak supervision, which uses the beauty prediction method based on multitasking and weak supervision as described in the method embodiment, can execute all of the steps of the beauty prediction method based on multitasking and weak supervision by means of cooperation of the modules, and has the same technical effects as the beauty prediction method based on multitasking and weak supervision. Details are not described herein again.

Some embodiments of the present disclosure provide a storage medium storing executable instructions which, when executed by a computer, cause the computer to perform the beauty prediction method based on multitasking and weak supervision as described in the method embodiment of the present disclosure.

Examples of the storage medium includes, but are not limited to, a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cartridge tape, a tape disk storage or other magnetic storage devices or any other non-transmission media, which can be used for storing information that can be accessed by a computing device.

The foregoing description provides only preferred embodiments of the present disclosure, and the present disclosure is not limited to the above-mentioned embodiments. Any embodiment achieving the same technical effects by the same means shall fall within the protection scope of the present disclosure.

What is claimed is:

1. A beauty prediction method based on multitasking and weak supervision, comprising the following steps:
   pre-processing inputted face images to obtain pre-processed images, wherein the pre-processed images comprise true value images marked with true value labels and noise images marked with noise labels;
   allocating the pre-processed images to multiple tasks, wherein each task comprises a plurality of the true value images and a plurality of the noise images, and the multiple tasks comprise one main task specifically for facial beauty prediction and multiple auxiliary tasks related to the facial beauty prediction;
   processing the true value images and noise images of the multiple tasks via a feature extraction layer to obtain shared image features; and
   processing the image features via a plurality of classification networks each comprising a residual network, a standard neural network and a classifier to obtain a plurality of classification results, wherein each of the plurality of classification networks corresponds to a respective one of the multiple tasks,
   wherein, in each of the classification networks, the residual network processes the image features, learns mapping from the image features to residual values of the true value labels and the noise labels and obtains a first predicted value; the standard neural network learns mapping from the image features to the true value labels and obtains a second predicted value; and each of the classification results is obtained by the classifier according to the first predicted value and the second predicted value.

2. The beauty prediction method based on multitasking and weak supervision of claim 1, wherein the pre-processing inputted facial images to obtain pre-processed images comprises sequentially performing image enhancement, image correction, image cropping, image de-duplication and image normalization on the facial images to obtain the pre-processed images.

3. The beauty prediction method based on multitasking and weak supervision of claim 1, wherein the feature extraction layer is one of VGG16, ResNet50, Google Inception V3 or DenseNet.

4. The beauty prediction method based on multitasking and weak supervision of claim 1, wherein an overall loss function of the multiple tasks is $L_{total}=\Sigma_1^n \omega_n * L_n$, where L is a loss of a single task, and con is a weight corresponding to each task.

5. The beauty prediction method based on multitasking and weak supervision of claim 1, wherein a loss function of the residual network is $$L_{noise} = \frac{1}{N_n}\sum_{t \in D_n} (y_t \ln(h_t) + (1 - y_t)\ln(1 - h_t)),$$

wherein $D_n$ is the image feature, $y_i$ is the noise label, $h_i$ is the first predicted value, $L_{noise}$ is a loss value of the residual network, and $N_n$ is a total number of the image features.

6. The beauty prediction method based on multitasking and weak supervision of claim 5, wherein a loss function of the standard neural networks is $$L_{clean} = \frac{1}{N_n}\sum_{j \in D_n} (v_j \ln(g_j) + (1 - y_j)\ln(1 - g_j)),$$

wherein $v_j$ is the true value label, $g_j$ is the second predicted value, and $L_{clean}$ is a loss value of the standard neural network.

7. The beauty prediction method based on multitasking and weak supervision of claim 6, wherein an overall goal of the plurality of classification networks is $$\operatorname*{argmin}_{W}((\alpha L_{clean,1} + L_{noise,1}) + \ldots + (\alpha L_{clean,n} + L_{noise,n})),$$

wherein W is a hyper-parameter, and $\alpha$ is a balance parameter between the loss value of the residual network and the loss value of the standard neural network.

8. The beauty prediction method based on multitasking and weak supervision of claim 1, wherein the noise images are more than the true value images in each task.

9. A beauty prediction device based on multitasking and weak supervision, comprising:
   a pre-processing module, configured to pre-process inputted facial images to obtain pre-processed images, wherein the pre-processed images comprise true value images marked with true value labels and noise images marked with noise labels;
   a multitasking module, configured to allocate the pre-processed images to multiple tasks, wherein each task comprises a plurality of the true value images and a plurality of the noise images, and the multiple tasks comprise one main task specifically for facial beauty prediction and multiple auxiliary tasks related to the facial beauty prediction;

a feature extraction module, configured to process the true value images and the noise images of the multiple tasks to obtain shared image features; and a classification module, configured to process the image features to obtain a plurality of classification results and comprises a plurality of classification networks each comprising a residual network, a standard neural network and a classifier, wherein each of the plurality of classification networks corresponds to a respective one of the multiple tasks, wherein, in each of the classification networks, the residual network processes the image features, learns mapping from the image features to residual values of the true value labels and the noise labels and obtains a first predicted value; the standard neural network learns mapping from the image features to the true value labels and obtains a second predicted value; and each of the classification results is obtained by the classifier according to the first predicted value and the second predicted value.

10. A non-transitory storage medium storing executable instructions which, when executed by a computer, cause the computer to perform a beauty prediction method based on multitasking and weak supervision comprising:

pre-processing inputted face images to obtain pre-processed images, wherein the pre-processed images comprise true value images marked with true value labels and noise images marked with noise labels;

allocating the pre-processed images to multiple tasks, wherein each task comprises a plurality of the true value images and a plurality of the noise images, and the multiple tasks comprise one main task specifically for facial beauty prediction and multiple auxiliary tasks related to the facial beauty prediction;

processing the true value images and noise images of the multiple tasks via a feature extraction layer to obtain shared image features; and processing the image features via a plurality of classification networks each comprising a residual network, a standard neural network and a classifier to obtain a plurality of classification results, wherein each of the plurality of classification networks corresponds to a respective one of the multiple tasks, wherein, in each of the classification networks, the residual network processes the image features, learns mapping from the image features to residual values of the true value labels and the noise labels and obtains a first predicted value: the standard neural network learns mapping from the image features to the true value labels and obtains a second predicted value; and each of the classification results is obtained by the classifier according to the first predicted value and the second predicted value.

11. The storage medium of claim 10, wherein the pre-processing inputted facial images to obtain pre-processed images comprises sequentially performing image enhancement, image correction, image cropping, image de-duplication and image normalization on the facial images to obtain the pre-processed images.

12. The storage medium of claim 10, wherein the feature extraction layer is one of VGG16, ResNet50, Google Inception V3 or DenseNet.

13. The storage medium of claim 10, wherein an overall loss function of the multiple tasks is $L_{total}=\Sigma_1^n \omega_n *L_n$, where L is a loss of a single task, and con is a weight corresponding to each task.

14. The storage medium of claim 10, wherein a loss function of the residual network is $$L_{noise} = \frac{1}{N_n}\sum_{t \in D_n} (y_t \ln(h_t) + (1-y_t)\ln(1-h_t)),$$

wherein $D_n$ is the image feature, $y_i$ is the noise label, $h_i$ is the first predicted value, $L_{noise}$ is a loss value of the residual network, and $N_n$ is a total number of the image features.

15. The storage medium of claim 14, wherein a loss function of the standard neural networks is $$L_{clean} = \frac{1}{N_n}\sum_{j \in D_n} (v_j \ln(g_j) + (1-y_j)\ln(1-g_j)),$$

wherein $v_j$ is the true value label, $g_i$ is the second predicted value, and $L_{clean}$ is a loss value of the standard neural network.

16. The storage medium of claim 15, wherein an overall goal of the plurality of classification networks is $$\underset{W}{\mathrm{argmin}}\,((\alpha L_{clean,1} + L_{noise,1}) + \ldots + (\alpha L_{clean,n} + L_{noise,n})),$$

wherein W is a hyper-parameter, and α is a balance parameter between the loss value of the residual network and the loss value of the standard neural network.

17. The storage medium of claim 10, wherein the noise images are more than the true value images in each task.

* * * * *